Oct. 1, 1968    R. COLOMBO    3,403,804
BLOWN BOTTLE OF FLEXIBLE PLASTICS
Filed Dec. 12, 1966    2 Sheets-Sheet 1

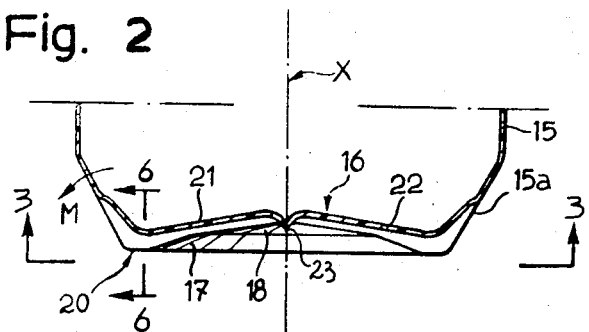
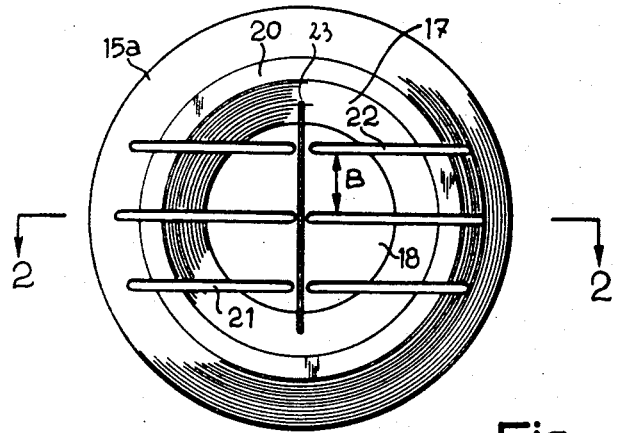
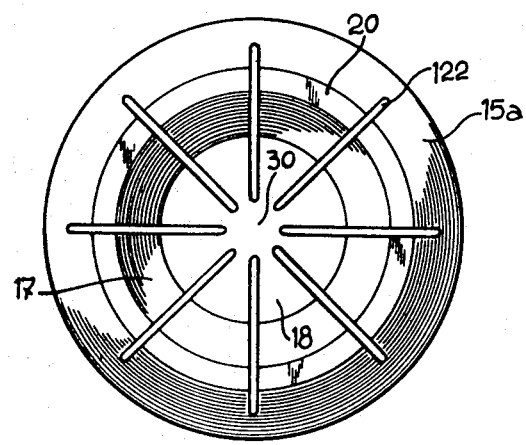

United States Patent Office 3,403,804
Patented Oct. 1, 1968

3,403,804
BLOWN BOTTLE OF FLEXIBLE PLASTICS
Roberto Colombo, Turin, Italy, assignor to L.M.P.
Lavorazione Materie Plastiche S.p.A., Turin, Italy
Filed Dec. 12, 1966, Ser. No. 600,813
Claims priority, application Italy, Dec. 10, 1965,
27,694/65
8 Claims. (Cl. 215—31)

ABSTRACT OF THE DISCLOSURE

A blown bottle of flexible plastic having a bottom comprising a cuspidate portion surrounded by a peripheral planar portion. A plurality of interiorly disposed U-shaped ribs form strengthening connections between the bottom and the lower region of a cylindrical body portion. The bottle neck has a lip which tapers toward the bottle axis.

---

The present invention relates to blown bottles of flexible plastics which are suitable for storing aerated beverages and similar liquids evolving an internal pressure. The storage of such liquids in flexible bottles has hitherto given rise to problems of distortion of the bottle shape and the present invention overcomes these problems by providing strengthening connections which extend from the bottom of the bottle to the inner walls of the lower regions of the cylindrical bottle body. The bottle bottom is formed with a re-entrant area which, in longitudinal section is of "planar cuspidate" profile, that is, a planar section surrounds a cuspidate section. As an advantageous feature this cuspidate section is formed from a base cone and upper cone of different summit angles. As a further advantageous feature, the lower region of the bottle body wall is formed frusto-conically. In all cases the strengthening connections comprise ribs but the various positionings and groupings of the ribs are disclosed and various dimensionings are stated to be preferable.

Blown bottles of flexible plastics, such as polyvinyl chloride, polyethylene, polypropylene and the like have heretofore found endless uses. However, one field in which such bottles could not be exploited has heretofore been the packing and distribution of aerated beverages and similar liquids evolving an appreciable internal pressure.

The main problem encountered is that blown bottles of flexible plastics tend to swell into flask form under the internal gas pressure generated by such liquids and as a result cannot be stood upright. This drawback can of course be obviated by increasing the wall thickness of the bottle, or by blowing the bottle from raw tube of relatively large diameter and thickness. However, as will be obvious, these solutions make the bottle expensive, in the light of the cost of the raw materials involved.

A further problem is to afford satisfactory seal at the mouth of such a flexible bottle by the now general and almost standardized use of crown caps.

A still further problem resides in the fact that the blowing technique necessarily involved in the production of such bottles imposes appreciable limitations on the shape of the bottle, both on account of the fact that the thermoplastic material can only be stretched to a certain limit during blowing, and that the extent of stretching or drawing cannot be sharply altered from one bottle region to another.

Finally, a stripping problem exists, and as a result there is necessarily entailed the frequent use of disassemblable moulds which are made up from three or more sections instead of only the two halves currently preferred in the art of moulding.

For these reasons, strongly aerated mineral waters and beers have heretofore generally still been packed in glass bottles. Tins are sometimes used for beer, but this manner of distribution is convenient for small liquid quantities only, which quantities will be consumed substantially immediately after opening of the can.

It is an object of the invention at least substantially to obviate the above drawbacks by providing a blown bottle of flexible plastics having an efficient bottom structure and adapted to withstand internal pressures of up to 2.5 atmospheres or even more without inflation into flask form.

According to a further object of the invention there is provided a blown bottle of flexible plastics material having a top or neck portion, a body portion and a bottom portion, wherein the bottom portion includes a re-entrant part of planar cuspidate section, the lower region of the substantially cylindrical wall of the body portion being formed on the inside with ribs of inverted U-shape in cross section, the said ribs forming strengthening connections between the bottom portion and the said lower region of the body wall.

If desired, the effectiveness of this structure against internal pressures acting on the bottle bottom may be further improved by imparting to the cuspidate part of biconical profile, the base cone of which is smaller in angular aperture than the top cone. It is preferable to make the said lower region of the body wall of frusto-conical shape.

These and other objects and advantages of the invention will be clear from the following description, given with reference to the accompanying drawings which are by way of example and in which:

FIG. 2 is a fragmentary axial sectional view of the bottom end of the bottle of FIG. 1, the section taken along line 2—2 of FIG. 3;

FIG. 3 is an end view of the bottom of the bottle of FIG. 1 as seen along line 3—3 of FIG. 2;

FIG. 4 is an end view similar to that of FIG. 3 but showing a modified embodiment of the invention;

The bottle shown is a one-litre bottle and is manufactured by blowing from a softened polyvinylchloride tube 10 by a known extrusion and blowing technique. The diameter of the tube 10 is somewhat smaller than the minimum diameter of the bottle neck, the general shape of the latter accurately matching that of known glass bottles for mineral waters.

Figure 5:
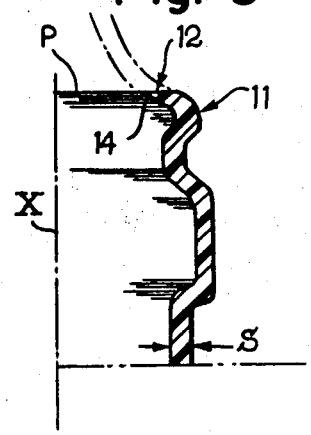
FIG. 5 is a fragmentary axial sectional view of the extreme top end of the bottle of FIG. 1.

During moulding, the material from which the top or neck portion of the bottle is formed (FIG. 5) undergoes a minimum stretch, so that the wall thickness S at this end of the bottle is relatively large and essentially commensurate to the sealing requirements of the closure method adopted.

For receiving a crown cap the bottle neck is terminated by a collar 11 for holding the cap. The collar is of quadrant profile in axial section, its top end being trimmed, after stripping, along a plane P which is perpendicular to the bottle axis X and which is substantially a tangent to the said quadrant. The bottle mouth is thus axially confined by a planar annular surface 12 which is appreciably extended in a radial direction and which is terminated by an annular lip 14 tapering towards the axis X from the collar 11. This arrangement affords a satisfactory seal with a crown cap.

The bottle body portion comprises a substantially cylindrical wall 15 which is provided with spaced pairs of grooves 16' impressed therein by the mould. The number of grooves 16' is chosen as sufficient to provide the number of encircling ribs found necessary to prevent the wall 15 from inflating to flask shape under internal gas pressure. This arrangement is known in the art.

Towards the bottom of the bottle the wall 15 is conically constricted to form a frusto-conical region 15a having a summit angle preferably of between 60 and 100°.

The bottle bottom and portion 16 is re-entrant to form in section a planar cuspidate part C (FIG. 1), made up (FIG. 2) of a cuspidate portion including a frusto-conical base 17 and a summit cone 18, the angle of taper of the former being less than that of the latter. Furthermore, the extent of re-entrance of the bottom is chosen to be such as still to afford a satisfactory stripping from a two-section mould, the closing plane of which mould extends through the bottle axis X and is perpendicular to the plane of FIGS. 2 and 3. The base 17 of the cuspidate part C merges into the frusto-conical region 15a via a planar annular region 20 which constitutes a stand-up base for the bottle. The term "planar cuspidate" as used herein refers to a planar portion surrounding a cuspidate portion, the way that planar region 20 surrounds cuspidate portion 17, 18.

The frusto-conical region 15a of the bottle body wall 15 performs two functions. Firstly, it somewhat reduces the diameter $d$ of the bottle bottom with respect to the diameter D of the bottle body, thereby reducing the total thrust on the bottom from an internal pressure build-up. Secondly, under such an internal pressure it is subject to an outward tilting moment M (FIG. 2) which, as will be seen hereafter, outweighs the thrust by the same pressure active on the bottom 16 thereby to prevent inward tilting of the region 15a and outer swelling of the bottom 16 into a rounded form. It should be noted that the thickness of the region 15a gradually increases in proportion to the reduction in diameter, this increase in thickness being one of the decisive factors relating to opposition against tilting of the bottom 16. Experience has shown that the diameter $d$ should amount to between 0.6 and 0.8D.

Figure 1:
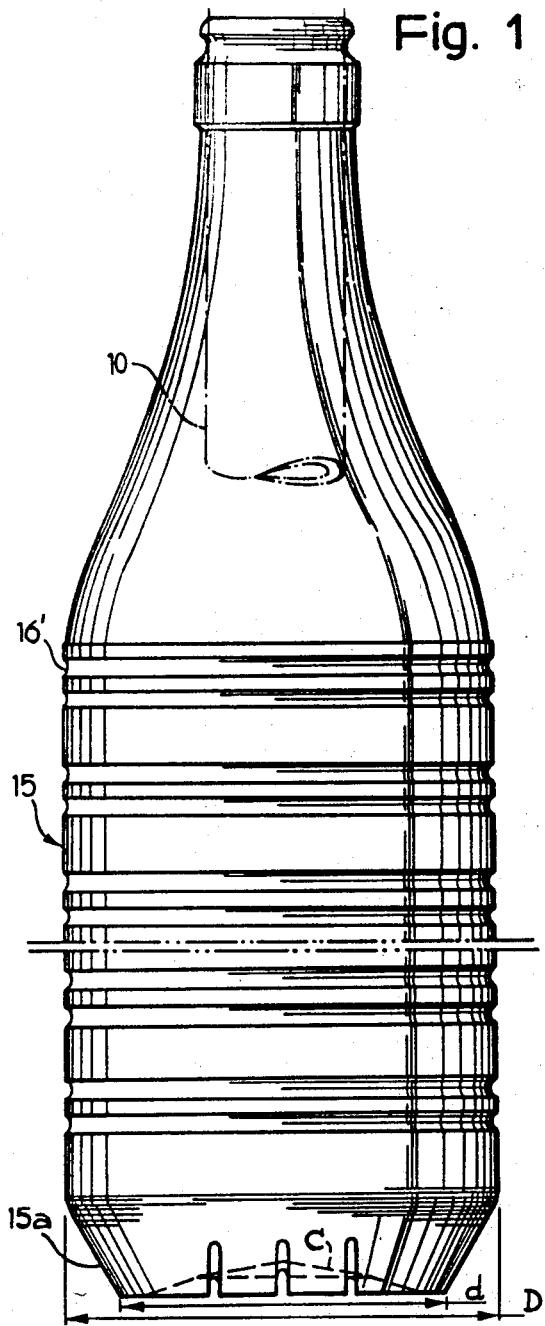
FIG. 1 is an elevational view of a bottle according to the invention, the said bottle being shown for convenience with a reduced axial length.
Figure 6:
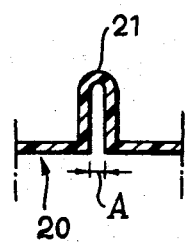
FIG. 6 is a sectional view taken along line 6—6 of FIG. 2.

In the embodiment according to FIGS. 1 to 3, the bottom 16 has extending thereacross two sets of parallel ribs 21, 22, the ribs of one set (21) being oppostie and parallel to the ribs of the other set (22) and each set comprising three uniformly spaced ribs. The said ribs extend into the bottle interior and are obtained by impression from the outside during blowing, such impression being achieved by a suitable construction of the two mould halves at the region of the bottom 16. The ribs extend perpendicular to the closing plane of the mould, each of them starting at the bottle wall from at least mid-way up the frusto-conical region 15a and terminating adjacent its corresponding rib of the opposite set, almost at the bottom middle line marked by the pinch 23 of the tube 10 from which the bottle has been made. Because of the nature of its origin, each rib is in practice formed as an inverted channel structure (see FIG. 6) having parallel or slightly diverging borders, the width or mean width A of which channel, when measured at its mouth, being preferably limited to within about ¼ of the width (or mean with) B (FIG. 3) of separation of the ribs.

Each rib reaches its maximum physical height where it overlies the planar annular region 20 and the ribs therefore substantially form a double formation connecting the middle line of the bottle bottom 16 with the wall region 15a so that, because of their attachment to the latter, swelling of the bottom 16 into a rounded form as a result of internal pressure build-up becomes practically impossible within the range of pressures likely to be encountered in normal use.

Various modifications of the invention are of course possible within the scope of the appended claims.

Thus, in order to further stiffen the bottle bottom, four or more ribs in each set may be employed in an embodiment otherwise according to FIG. 3. Nevertheless, the abovementioned relation between A and B should preferably be maintained and as an average valve, in a one-litre bottle, A is generally of about 1.5 mm.

Furthermore, and as shown in FIG. 4, the bottom ribbing may be arranged as a regular star of ribs 122 diverging from the bottle bottom centre. In this way the region 30 of the apex of the cuspidate part C is left free of ribs. In all other respects, however, the embodiment of FIG. 4 remains similar to the previously described embodiment, but, as will be evident, manufacture of the embodiment of FIG. 4 will require a free-section mould for stripping to be possible.

What I claim is:
1. Blown bottle of flexible plastics material comprising:
   (A) a top neck portion,
   (B) a body portion, and
   (C) a bottom portion, the said bottom portion having formed therein a re-entrant part which, in section, is of profile having an outer planar portion surrounding an inner cuspidate portion,
the said body portion being of substantially cylindrical form and comprising a lower region, the said bottle further comprising a plurality of ribs of inverted U-shape in cross section, the said ribs forming strengthening connections between the same bottom portion of the bottle and the said lower region of the said body portion, the said ribs being disposed within the interior of the said bottle.

2. Bottle as defined in claim 1 wherein the said lower region of the body wall is frusto-conical, its summit angle being of between 60° and 100°.

3. Bottle as defined in claim 1 wherein the said cuspidate part is biconical, the base cone thereof having smaller angle of taper than the top cone thereof.

4. Bottle as defined in claim 3, wherein there is provided an annular planar region by means of which the said base cone of the said cuspidate part and the said lower region of the said body wall merge one into the other, the said ribs extending thereover.

5. Bottle as defined in claim 1 wherein the bottle comprises a diametrical bottom region towards which the said ribs extend in two parallel sets without intersection of the said diametrical region.

6. Bottle as defined in claim 1 wherein the said bottle includes a central region corresponding to the center of the said cuspidate part, the said ribs being arranged as a star about the said center.

7. Bottle as defined in claim 1, wherein at least the mean thickness of the said ribs measured at their mouths is less than ¼ of at least the mean width of rib separation.

8. Bottle as defined in claim 1, wherein a planar annular surface of the top neck portion is provided, the said planar annular surface being perpendicular to the bottle axis and defining a bottle mouth, there being further provided an annular lip and a collar for a closure cap, the said annular lip tapering towards the said bottle axis and the lip's inner surface merging into the said planar annular surface.

References Cited

UNITED STATES PATENTS

| | | | |
|---|---|---|---|
| 3,029,963 | 4/1962 | Evers | 215—1 |
| 3,091,360 | 5/1963 | Edwards | 215—1 XR |
| 3,140,796 | 7/1964 | Broida | 220—72 XR |
| 3,204,799 | 9/1965 | Hunter et al. | 215—31 |
| 3,232,495 | 2/1966 | Schneider. | |

FOREIGN PATENTS 1,351,140  12/1963  France.

DONALD F. NORTON, *Primary Examiner.*